E. HARRISON.
Grinding Mill.
No. 81,780. Patented Sept. 1, 1868.
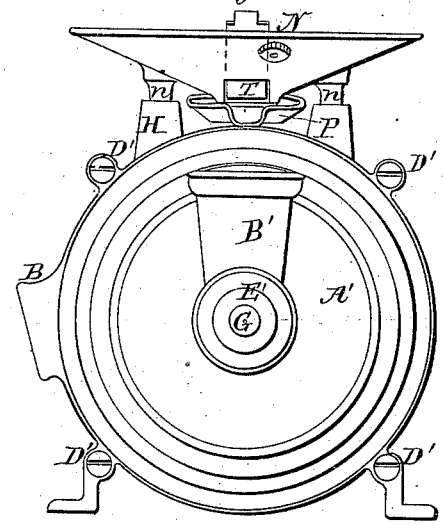
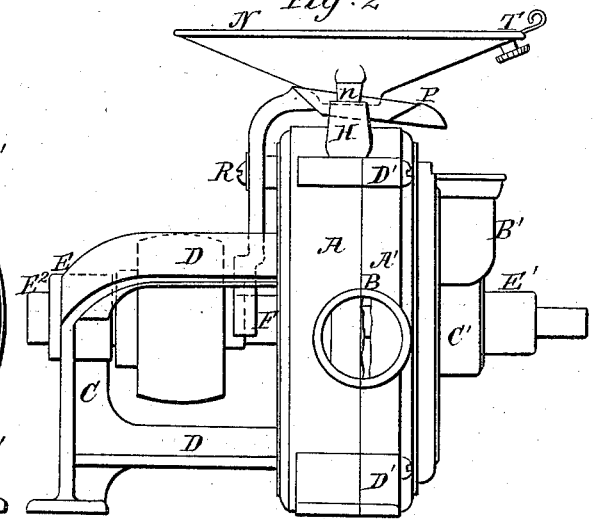
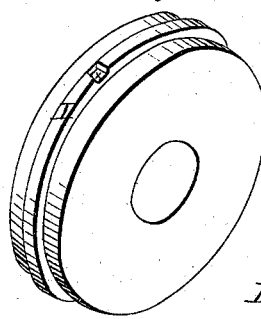
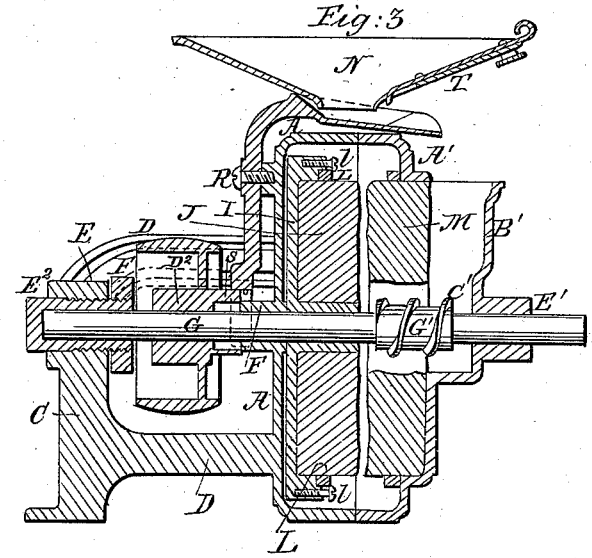
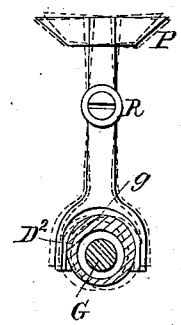
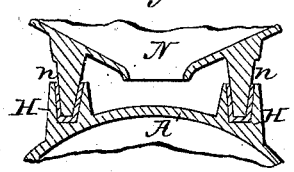

United States Patent Office.

EDWARD HARRISON, OF NEW HAVEN, CONNECTICUT.

Letters Patent No. 81,780, dated September 1, 1868.

IMPROVED GRINDING-MILL.

*The Schedule referred to in these Letters Patent and making part of the same.*

TO ALL WHOM IT MAY CONCERN:

Be it known that I, EDWARD HARRISON, of New Haven, in the county of New Haven, and State of Connecticut, have invented a new Improvement in Grinding-Mills; and I do hereby declare the following, when taken in connection with the accompanying drawings, and the letters of reference marked thereon, to be a full, clear, and exact description of the same, and which said drawings constitute part of this specification, and represent, in—

Figure 1, a front view.
Figure 2, a side view.
Figure 3, a vertical central section.
Figure 4, a perspective view of each of the stones.
Figure 5, the rocker detached; and in
Figure 6, a sectional view, showing the manner of attaching the hopper.

This invention relates to an improvement in that class of grinding-mills for which Letters Patent were granted to me, bearing date June 5, 1854, but particularly upon the class upon which the stones are placed upon a horizontal axis, the object being to reduce the cost of construction and increase the durability; and the invention consists—

First, in constructing the husk for the runner-casing, with the supporting-frame, shaft, bearings, and sockets, for the support of the hopper, and half of the discharge-spout, in one and the same piece, whereby a large amount of fitting, numerous bolts, and other expenses of combining the parts, are avoided.

Second, in casting the husk for the fixed or bed-stone, the other half of the discharge-spout, feeding-spout, and bearing for the shaft, in one and the same piece.

Third, in attaching the hopper to the mill, by forming conical studs upon the under side of the hopper, placing the said studs into the sockets on the runner-husk, and pouring metal around the said studs, so as to make a perfect fit and adjustment of the hopper, while the sockets are formed solidly on the husks.

Fourth, in the arrangement of the rocker or feeding-shoe beneath the mouth of the hopper, so as to be operated by an eccentric on the driving-pulley, to vibrate or rock the shoe, to conduct the grain from the hopper to the feeding-spout.

Fifth, in fixing a band centrally upon the edge of the stone or stones, which said band forms a bearing for the stones, so that they may be reversed and replaced in their proper position, the two sides of each being parallel the one to the other.

Also, in securing the stones, one to the runner-plate, the other to the bed-stone casing, by means of the said band.

To enable others to construct and use my improvement, I will fully describe the same, as illustrated in the accompanying drawings.

A is the runner, husk, or casing; B, the discharge-spout, one-half of which is cast upon the said casing; C, the supporting-frame, attached or made a part of the casing by means of the arms D, which extend from the said frame C to the casing A, and in the said frame C, at E, and in the casing A, at F, is formed a bearing for the shaft G, and upon the casing A are formed two sockets, H H, for the hopper, all in one and the same piece.

Heretofore the frame has been made in several parts, all fitted and secured together and to the casing by means of bolts, and the hopper-connections have also been formed separate and attached by bolts, for the reason more fully hereafter shown, but in this invention they are all cast solidly together, thereby avoiding the expense of bolting and fitting.

$A^1$ is the bed-stone case, having formed upon its outer surface a feeding-spout, $B^1$, and chamber $C^1$, and a bearing, $E^1$, for the shaft, and also the other half of the discharge-spout B, all in one and the same piece, thus avoiding the bolting and fitting heretofore required. The two parts of the case, A and A¹, are fitted together and secured by bolts D¹, thus forming a complete casing and the bearings of the mill in but two parts, whereby a large portion of the expense of construction heretofore required is avoided.

Within the casing A, and upon the shaft G, is arranged the runner-plate or bed I, (see fig. 3.) The runner-stone J is constructed in the usual manner for millstones, but upon the edge of the stones, and centrally, I place a metallic flange or band, L, (see fig. 4.) The two surfaces of the stone being formed parallel to each other, the flange L, when laid upon the plate I, as in fig. 3, will present the grinding-surface of the stone the same, whichever of the two surfaces is presented, the bearing of the stone being upon the flange. Therefore, when one of the surfaces becomes worn, the stone may be easily reversed, the flange presenting it in its proper position without other adjustment; and by means of the said flange, I secure the stone to the runner-plate I by screws $l$, as seen in fig. 3, a sufficient number of screws being employed to firmly secure the stone to the plate. It is necessary that the stones be always secured in the same position, in order that the balance of runner-stone be maintained, and that the meeting surfaces of the two be always in the same relative position to each other. To insure this, I form a notch, $x$, in the flange L, into which one of the securing-screws sets. Therefore, when the stones, or either of them, are replaced after having been removed for any purpose, they must be replaced so that the notch $x$ be presented to the same screw. Other means of indicating the position may be employed, but this I prefer. One end of the shaft rests in a bearing, E¹, and in the rear, in the bearing F, by an adjustable sleeve, E², fitted on to the end of the shaft, and so as to bear against the end, as seen in fig. 3; and upon the said sleeve, inside the bearing E, is arranged a nut, F¹, so that by the turning of the nut the sleeve E² may be drawn in, so as to force the shaft forward, and with it the runner-stone. A spline or other device should be applied to the sleeve, to prevent its turning with the shaft. Upon the said shaft is fixed a driving-pulley, D², to which power is applied, to cause the shaft to revolve, and with it the runner-stone, in any convenient manner.

M is the bed-stone, constructed with a flange upon its edge, in like manner as the runner-stone, as before described, and is screwed into the bed-stone husk, as in fig. 3, in like manner and with the same object as the runner-stone is secured into its place, the central opening through the bed-stone being sufficiently large to permit the passage of the grain between the two stones.

Upon the shaft G, and within the chamber C¹, I arrange a worm, which revolves with the shaft, so as to draw the grain from the chamber C¹, through the opening in the bed-stone to the stones, to be ground.

N is the hopper, of usual form, and upon its under side are formed or attached conical studs $n$. The sockets on the casing A have a recess cast upon their upper ends, corresponding nearly to the studs $n$ on the hopper. The hopper set in position, the studs $n$ in the sockets, then in the space around the studs in the sockets metal is poured, to fill the space, and thus fit the hopper in its seat, which, when the metal is cool, may be removed at pleasure.

Heretofore, in the attachment of the hopper, it has been required to fit the connections and then attach them to the casing, which necessitates a considerable amount of labor, which, by my improvement, is avoided, and by which improvement I am enabled to cast the sockets solidly on the casing.

Beneath the hopper is arranged the shoe or rocker P, of the usual form, from which extends a lever, pivoted at R, on the casing, with an arm extending down and forked over an eccentric, S, on the pulley D², as seen in figs. 3 and 5, so that by the revolving of the pulley the eccentric vibrates or rocks the shoe, as denoted in fig. 5, and, as the revolution of the pulley is very rapid, the rocking or vibrating motion of the shoe agitates the grain sufficiently to force it from the shoe, to fall into the feeding-spout B¹, from whence it is conducted to the stones.

The hopper is arranged with a slide, T, for the purpose of adjusting the quantity of grain which enters the shoe.

Thus constructed and operating, if it is required to grind finer, turn the nut F, to draw in the sleeve E², and thus force the runner-stone nearer to the bed-stone, or, if to grind coarser, reverse.

Another advantage than that which I have described for constructing the stones with the flange L, is, that the opposite sides of the stones may be prepared to grind, the one for flour, the other for ordinary meal, so that the same mill may answer a double purpose by simply reversing the stones. It is not essential that the stones be double-faced to make the flange L applicable, as that may be employed upon a single-faced stone with great advantage, as a means of adjusting and securing the stone. I therefore do not confine myself to the use of the flange for double-faced or reversible stones.

I do not broadly claim agitating the shoe or feed directly from the shaft; neither do I wish to be understood as claiming the construction of a stone so as to grind upon both surfaces at the same time, as such I know to be common, as may be seen in the patent of Silas Dodson, June 16, 1863; neither do I wish to be understood as claiming the adjustment of the stones, or either of them, by the arrangement of a flange, when the said flange is independent of the stone.

Having thus fully described my invention, what I claim as new and useful, and desire to secure by Letters Patent, is—

1. The husk or runner-case A, constructed in one and the same piece with discharge-spout B, frame C, connections D, bearings E and F, sockets H H, substantially as set forth.

2. Fitting hopper N into sockets H in the manner described, when said sockets are a part of one of the husks of the mill.

3. The rocker P, pivoted to the husk, and so as to be operated by an eccentric or cam, S, on the pulley or shaft, substantially as and for the purpose specified.

4. A double-faced stone, provided on its edge with a central flange, L, when the surfaces of the said flange bear the relative position to the face of the stone as described, so as to be set and adjusted to present either face of the stone in the same relative position to the grinding-surface of the other stone, substantially as and for the purpose specified.

5. In combination with the subject-matter of the above fourth clause, the runner-plate or bed-stone husk, constructed so as to receive the stone, substantially as and for the purpose specified.

EDWARD HARRISON.

Witnesses:
J. H. SHUMWAY,
A. J. TIBBITS.